US012021415B2

(12) United States Patent
Eggler et al.

(10) Patent No.: US 12,021,415 B2
(45) Date of Patent: Jun. 25, 2024

(54) ROTOR FOR AN ELECTRIC MACHINE AND ELECTRIC MACHINE HAVING A ROTOR

(71) Applicant: ZF Friedrichshafen AG, Friedrichshafen (DE)

(72) Inventors: Jochen Eggler, Waldburg (DE); Ulrich Kehr, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 96 days.

(21) Appl. No.: 17/577,477

(22) Filed: Jan. 18, 2022

(65) Prior Publication Data

US 2022/0271582 A1 Aug. 25, 2022

(30) Foreign Application Priority Data

Feb. 19, 2021 (DE) ...................... 10 2021 201 602.2

(51) Int. Cl.
*H02K 1/276* (2022.01)
*H02P 6/21* (2016.01)
*H02P 29/66* (2016.01)

(52) U.S. Cl.
CPC ............... *H02K 1/276* (2013.01); *H02P 6/21* (2016.02); *H02P 29/66* (2016.02)

(58) Field of Classification Search
CPC .... H02K 1/276; H02K 11/0094; H02K 11/20; H02K 11/35; H02P 1/445; H02P 29/66; H02P 6/21

(Continued)

(56) References Cited

U.S. PATENT DOCUMENTS 5,200,660 A * 4/1993 Heidelberg .......... H02K 21/029
310/191
5,663,605 A * 9/1997 Evans .................... H02K 21/04
310/263

(Continued)

FOREIGN PATENT DOCUMENTS

DE 102006021489 A1 11/2007
DE 102006048966 A1 4/2008

(Continued)

OTHER PUBLICATIONS

Translation of foreign patent document DE 102014213446 A1 (Year: 2016).*

(Continued)

*Primary Examiner* — Alex W Mok
(74) *Attorney, Agent, or Firm* — Dority & Manning, P.A.

(57) ABSTRACT

A rotor (1) for an electric machine (2) has a rotor body including multiple poles. The rotor (1) further has at least one sensor element (3) for detecting at least one condition variable of the rotor (1), and a signal processing unit (4) connected to the at least one sensor element (3). The signal processing unit (4) is configured to generate measured data from the condition variable of the rotor (1) and to transmit the measured data to a control device (5). Additionally, the rotor (1) has at least one induction coil (7), where each of the at least one induction coil (7) includes at least one electrical conductor (8). The at least one induction coil (7) is arranged at the rotor (1) and is configured to generate electrical energy from a magnetic field that is temporally changing during operation of the electric machine (2).

17 Claims, 4 Drawing Sheets

(58) Field of Classification Search
USPC .................................................. 310/156.01
See application file for complete search history.

(56) References Cited

U.S. PATENT DOCUMENTS

| | | | | | |
|---|---|---|---|---|---|
| 6,011,333 | A | * | 1/2000 | Yamaguchi | H02K 7/063 |
| | | | | | 310/40 MM |
| 6,563,246 | B1 | * | 5/2003 | Kajiura | H02K 21/029 |
| | | | | | 903/952 |
| 8,004,128 | B2 | * | 8/2011 | Abe | H02K 11/21 |
| | | | | | 310/67 R |
| 8,217,545 | B2 | * | 7/2012 | Kawasaki | G01D 5/2046 |
| | | | | | 310/156.08 |
| 8,324,768 | B2 | * | 12/2012 | Nakano | H02K 29/12 |
| | | | | | 310/68 B |
| 8,421,446 | B2 | * | 4/2013 | Straubinger | G01D 5/202 |
| | | | | | 324/207.15 |
| 8,796,898 | B2 | * | 8/2014 | Hashiba | H02K 1/223 |
| | | | | | 310/182 |
| 9,013,083 | B2 | * | 4/2015 | Morita | H02K 1/146 |
| | | | | | 310/216.069 |
| 9,093,878 | B2 | * | 7/2015 | Huh | H02K 1/223 |
| 9,484,791 | B2 | * | 11/2016 | Brockerhoff | H02K 11/35 |
| 9,906,108 | B2 | * | 2/2018 | Huh | H02K 21/46 |
| 9,941,775 | B2 | * | 4/2018 | Fiseni | H02K 1/28 |
| 10,256,758 | B2 | * | 4/2019 | Frampton | H02P 9/04 |
| 10,263,500 | B2 | * | 4/2019 | Woehl-Bruhn | H02K 1/2766 |
| 10,826,418 | B2 | * | 11/2020 | Frampton | H02K 7/1815 |
| 2010/0194226 | A1 | | 8/2010 | Metzner et al. | |
| 2010/0207475 | A1 | * | 8/2010 | Kawasaki | H02K 29/12 |
| | | | | | 310/156.01 |
| 2018/0262091 | A1 | * | 9/2018 | Gieras | H02K 11/33 |
| 2019/0222105 | A1 | * | 7/2019 | Yagyu | H02K 21/029 |

FOREIGN PATENT DOCUMENTS

| | | |
|---|---|---|
| DE | 102014213446 A1 | 1/2016 |
| WO | 2007/128673 | 11/2007 |

OTHER PUBLICATIONS

German Search Report 10 2021 201 602.2, dated Mar. 14, 2022. (12 pages).

\* cited by examiner

ROTOR FOR AN ELECTRIC MACHINE AND ELECTRIC MACHINE HAVING A ROTOR

CROSS-REFERENCE TO RELATED APPLICATION

The present application is related and has right of priority to German Patent Application No. 10 2021 201 602.2 filed on Feb. 19, 2021, the entirety of which is incorporated by reference for all purposes.

FIELD OF THE INVENTION

The invention relates generally to a rotor for an electric machine. The invention further relates generally to an electric machine having a rotor of this type.

BACKGROUND

For example, DE 10 2006 021 489 A1 discloses an electric machine having a stator and a rotor. The electric machine is a permanent-magnet synchronous machine, wherein the rotor includes a rotor body having permanent magnets arranged in the interior of the rotor body as well as flux barriers. The permanent magnets form poles of the electric machine, wherein at least one permanent magnet is arranged in the area of each pole.

In order to be able to optimally operate an electric machine, it is significant, in particular, to determine condition variables of the rotor by sensors and make the condition variables available to a control device of the electric machine. Previously it has been difficult to supply such sensors, which are associated with the rotor of the electric machine and rotate together with the rotor, with sufficient electrical energy.

For example, the continuous power of an electric machine is limited, among other things, by the maximum permissible temperature of the rotor, in particular of the magnets in the case of a permanent-magnet synchronous machine or of the cage of an induction machine. During the operation of the electric machine, the current rotor temperature is generally not known as a measured quantity and is estimated by a temperature model. As a result, an allowance must be made for a safety margin for the maximum temperature, and so the electric machine cannot be optimally operated due to this safety margin. If the maximum temperature is exceeded, there is a risk of the electric machine overheating and becoming damaged.

SUMMARY OF THE INVENTION

In one embodiment, a rotor for an electric machine, and an electric machine, is provided in particular, where the operation of the electric machine is improved and the risk of the electric machine overheating is to be reduced by the rotor. Moreover, the rotor is easily and quickly installable.

A rotor according to example aspects of the invention for an electric machine has a rotor body including two or more poles, the rotor further includes at least one sensor element configured for detecting at least one condition variable of the rotor, a signal processing unit connected to the at least one sensor element and configured for generating measured data based at least in part on the detected condition variable of the rotor and transmitting the measured data to a control device, and at least one induction coil including at least one electrical conductor and arranged at the rotor. The at least one induction coil is configured for generating electrical energy from a magnetic field, which is temporally changing during the operation of the electric machine.

In other words, the rotor of the electric machine includes the at least one sensor element, optionally multiple sensor elements, as well as the signal processing unit, and the at least one induction coil including the at least one electrical conductor. In particular, the at least one sensor element, the signal processing unit, and the at least one induction coil are connected to the rotor in a positionally fixed and rotationally fixed manner, i.e., at least arranged thereon, in particular integrated in the rotor.

Preferably, the at least one induction coil is configured for supplying the signal processing unit and/or the at least one sensor element with electrical energy. Consequently, either the signal processing unit is supplied with electrical energy or the at least one sensor element is supplied with electrical energy, or both the signal processing unit and the at least one sensor element are supplied with electrical energy.

Via the at least one induction coil, it is possible during the operation of the electric machine to obtain electrical energy from the temporally changing magnetic field of the electric machine. Particularly, a changing magnetic field flows through the at least one induction coil when the rotor is rotating, as the result of which an electric current or a voltage is induced in the at least one induction coil. The induced electric current or voltage in the at least one induction coil is utilized for supplying electrical energy to the at least one sensor element and the signal processing unit, which are arranged at the rotor in a rotationally fixed manner and rotate together with the rotor. In this way, collecting rings and batteries for the power supply of the components rotating with the rotor are dispensed with, as the result of which the rotor is easily and quickly installed, is not subject to mechanical wear (as would be the case with collecting rings), and is not subject to a limited service life (as would be the case with batteries).

Advantageously, the position of the induction coil at the rotor and the size of the induction coil, in particular a coil width, i.e., the distance between a forward-conductor section and a return-conductor section of the induction coil, are matched to strongly present orders of a harmonic field of the electric machine. This is the case because the orders of the harmonic field cause, at a constant operating point of the electric machine, a temporally changing magnetic field, which is particularly well suited for generating electrical energy by the induction coil.

The at least one sensor element is arranged directly at the rotor such that it immediately detects condition variables of the rotor, in particular a temperature of the rotor, in order to reduce the risk of the electric machine overheating. The at least one sensor element is just as suitable for measuring absolute temperatures as it is for detecting temperature differences. For example, the temperature of the rotor is a condition variable of the rotor. For example, the at least one sensor element is arranged directly at or at least adjacent to the point of origin of the condition variable. A short measuring path between the at least one sensor element and the point of origin of the condition variable increases the measuring accuracy.

Preferably, the energy transmission takes place at least between the at least one induction coil and the element to be supplied with energy by wiring. In one first embodiment, the induction coil is connectable to the at least one sensor element by wiring. Alternatively, the induction coil is connectable to the signal processing unit by wiring. Alternatively, the induction coil is arranged on a circuit board together with the signal processing unit. Alternatively, the induction coil is arranged on a circuit board together with the sensor.

In particular, the signal processing unit is wirelessly connected to the control device for signal transmission and/or data transmission. The at least one sensor element is preferably connected to the signal processing unit via wiring for signal transmission and/or data transmission. For example, the control device is arranged outside the rotor, although within the vehicle.

According to one preferred embodiment of the invention, at least the signal processing unit is arranged at an end face of the rotor. For example, the at least one sensor element is arranged at an end face of the rotor. For example, the at least one sensor element is arranged in an area of the rotor that heats up to an extreme extent when the electric machine is loaded. The end-face arrangement at least of the signal processing unit, and optionally of the at least one sensor element, is advantageous because the properties of the rotor, in particular the electrical and magnetic properties of the electric machine, are not negatively influenced and the radio transmission is simplified. Moreover, the end face of the rotor is particularly readily accessible not only for the installation, but rather also for maintenance, as the result of which the rotor and the elements arranged thereon are easily and quickly installed.

According to one preferred embodiment of the invention, the at least one sensor element is integrated in the signal processing unit. Consequently, the at least one sensor element and the signal processing unit form one single component, which is arranged at the rotor.

According to one preferred embodiment of the invention, the at least one sensor element is arranged in the interior of the rotor. In other words, the at least one sensor element is not arranged on a surface of the rotor, but rather in a recess in the rotor. In particular, the at least one sensor element is arranged in the interior of the rotor such that a point of origin of the condition variable is in close proximity of the sensor element.

According to one preferred embodiment of the invention, at least one permanent magnet is arranged in the area of each pole of the rotor. Preferably, the at least one permanent magnet has an essentially rectangular cross-sectional area in the area of each pole and extends further in the circumferential direction than in the radial direction. In other words, the particular permanent magnet is wider than it is tall, wherein the axial length essentially corresponds to the rotor length. The permanent magnet is dividable into sub-magnets in the axial direction or the radial direction.

Preferably, the rotor has at least two poles, preferably at least six poles, wherein each pole has at least one permanent magnet, preferably two permanent magnets.

According to one preferred embodiment of the invention, the at least one conductor of the at least one induction coil extends in a first direction in a first area of the rotor and, extends back from the first direction, i.e., in a second direction that is opposite the first direction, in a second area of the rotor. In particular, the first direction is the longitudinal direction of the rotor. Multiple forward-conductor sections and multiple return-conductor sections are provided as a function of the number of windings of the induction coil, wherein the more windings an induction coil has, the greater is the amount of voltage that is generatable. In other words, the at least one conductor of the at least one induction coil is designed such as if it were wound around an inner core, wherein merely empty space or air space, rather than a core, is located radially within the induction coil. For example, the electrical conductor is wound around a core and, before the attachment at the rotor, the core is removed. Consequently, this core is utilized for shaping the induction coil before installation.

According to one preferred embodiment of the invention, the at least one induction coil is arranged on a circuit board. This embodiment is not only particularly easy to install, but rather, it is also optimized for production. A circuit board is to be understood as a printed circuit plate, i.e., a flat element having two relatively large end faces, wherein one of the end faces is placed against the rotor and the other end face accommodates the induction coil. For example, the conductor is arranged on an end face of the circuit board and is fixedly connected to the circuit board in order to form the induction coil on the circuit board. For example, the conductor is integrated into the circuit board, i.e., is a fixed integral part of the circuit board.

According to one preferred embodiment of the invention, the circuit board is flexible. Alternatively, the circuit board is rigid or at least partially flexible and partially rigid, in particular, semi-flexible. An at least partially or completely flexible circuit board offers the advantage of an accurate conformance to an uneven surface of the rotor, in particular to a curved surface of the rotor. A rigid circuit board, however, has greater strength and dimensional stability also at high rotational speeds of the rotor.

According to one preferred embodiment of the invention, the circuit board is arranged at an outer circumferential surface of the rotor. A particularly great amount of electrical energy is generatable at the outer circumferential surface of the rotor via the induction coil. Preferably, the circuit board is fixed to the induction coil by adhesive and/or a binding band at the outer circumferential surface of the rotor. For example, the binding band extends circumferentially at the outer circumferential surface of the rotor and fixedly holds the circuit board, including the induction coil, in a positionally accurate and dimensionally stable manner also at high rotational speeds of the rotor. Alternatively or in addition to the binding band, the circuit board including the induction coil is fixed at the outer circumferential surface of the rotor by adhesive. A binding band is understood to be a wrap that at least partially, preferably completely, surrounds the outer circumferential surface of the rotor and is placed over the circuit board including the induction coil such that the circuit board with the induction coil is held in a positionally fixed manner at the outer circumferential surface of the rotor.

According to one preferred embodiment of the invention, the at least one induction coil or the circuit board including the induction coil is arranged in an indentation provided therefor at an outer circumferential surface of the rotor. This embodiment is not only particularly easy to install, but rather, is also optimized for production. For example, the indentation at the outer circumferential surface of the rotor extends essentially in the longitudinal direction of the rotor. The induction coil arranged in the indentation is connected to the rotor in a form-fit or form-locking manner at least in the direction of rotation, preferably also in the longitudinal direction of the rotor. In particular, the at least one induction coil is arranged in the indentation at the outer circumferential surface of the rotor with an exact fit, wherein the induction coil is radially inserted into the indentation for installation. A particularly great amount of electrical energy is generated at the outer circumferential surface of the rotor via the induction coil. Preferably, the induction coil is fixed at the outer circumferential surface of the rotor by adhesive and/or a binding band. Alternatively or in addition to the binding band, the circuit board including the induction coil is fixed at the outer circumferential surface of the rotor by adhesive.

According to one preferred embodiment of the invention, a slot is formed in the rotor for accommodating the circuit board and the induction coil. A slot is understood to be a narrow recess that is formed in the axial direction in the rotor and is dimensioned such that the circuit board including the induction coil is axially pushed into the slot with an exact fit. The circuit board including the induction coil is held in the recess in a form-fit or form-locking manner and is fixed at least in the direction of rotation and in the radial direction. Optionally, the circuit board including the induction coil is secured against slipping axially. For example, the circuit board including the induction coil is at least partially or completely glued in the slot. Due to the flat design of the circuit board and of the narrow slot, the magnetic field of the rotor is influenced only to a very low extent. This is advantageous, in particular, because a reduction of this magnetic field would result in a reduction of the torque and the power of the electric machine. Moreover, this embodiment is particularly easy to install.

According to one preferred embodiment of the invention, the induction coil is wound around a core, wherein a recess is formed in the rotor for accommodating the core including the induction coil. Consequently, the core or the coil core is arranged radially within the induction coil. This is a particularly cost-effective embodiment. The recess is formed in the axial direction in the rotor and is dimensioned such that the induction coil wound around the core is axially pushed into the recess with an exact fit. Preferably, the core is formed from a material that participates in the magnetic flux in a suitable way and, thus, reduces the influence of the recess to a minimum. For example, the core is formed from the same material as the rotor laminations. This is advantageous for the torque and the power of the electric machine as well as for the energy generation by the induction coil.

According to one preferred embodiment of the invention, the core is formed from a plurality of axially stacked sheet-metal elements. In other words, the sheet-metal elements of the core are stacked identically to the sheet-metal elements of the stator in the longitudinal direction of the rotor and, in this way, form the core. This is favorable in terms of fabrication and facilitates installation. Preferably, the sheet-metal elements are formed from a material that participates in the magnetic flux in a suitable way and, thus, reduces the interference or influence of the recess to a minimum. For example, the sheet-metal elements are formed from the same material as the rotor laminations.

According to one preferred embodiment of the invention, at least the induction coil is arranged in an area between two poles or on an axis that extends through one pole. The axis between two poles is generally known as the q-axis. These two arrangement variants are advantageous for a minor effect on the magnetic field and, simultaneously, a high energy yield by the induction coil.

An electric machine according to the invention includes a control device for the open-loop control of the electric machine as well as a stator and a rotor according to the invention. An air gap is formed between the stator and the rotor. The control device is preferably arranged in the vehicle and is utilized for the open-loop and closed-loop control of the electric machine.

The invention also relates to a vehicle having an electric machine according to the invention. In particular, the vehicle is a motor vehicle, for example, a passenger car, wherein the electric machine is configured as a prime mover of the vehicle in order to at least partially, in some instances completely, electrically drive the vehicle. Consequently, the vehicle is preferably a hybrid vehicle or an electric vehicle.

BRIEF DESCRIPTION OF THE DRAWINGS

Multiple preferred embodiments of the invention are explained in greater detail in the following with reference to the drawings, wherein identical elements are labeled with the same reference character, wherein.

DETAILED DESCRIPTION

Figure 1:
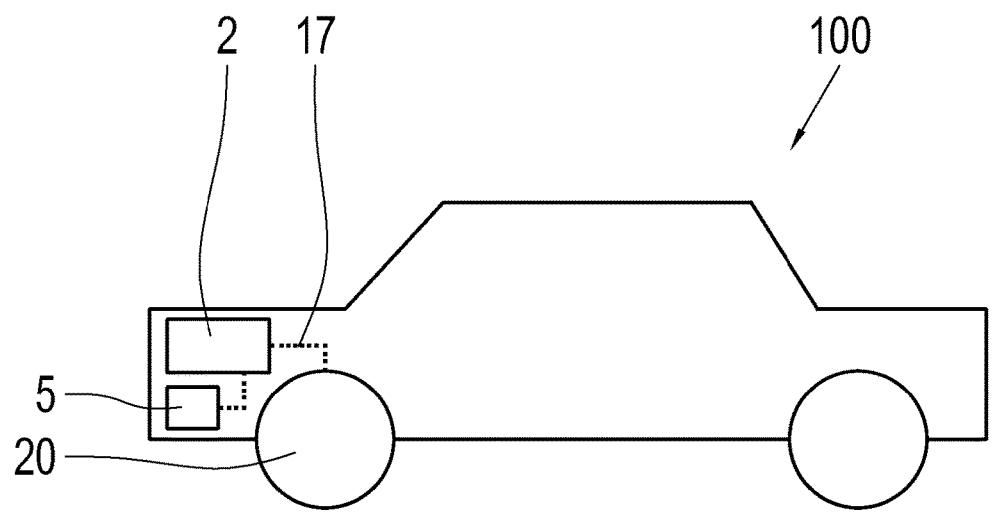
FIG. 1 shows a highly schematic view of a vehicle including an electric machine according to the invention.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

According to FIG. 1, a vehicle 100 includes an electric machine 2 according to the invention, which is configured for driving the vehicle 100. For this purpose, the electric machine 2 is drivingly connected, for example, via shafts 17 and, optionally, via further components, to driving wheels 20 of the vehicle 100. Moreover, the electric machine 2 is actuated and operated by a control device 5, which is arranged in the vehicle 100. In particular, the control device 5 is utilized for protecting the electric machine 2 against overheating during the operation, in that the maximum power of the electric machine 2 is adapted, in particular to a currently measured temperature of the rotor 1. For this purpose, the control device 5 is connected to the electric machine 2 in a signal-transmitting manner.

Figure 2:
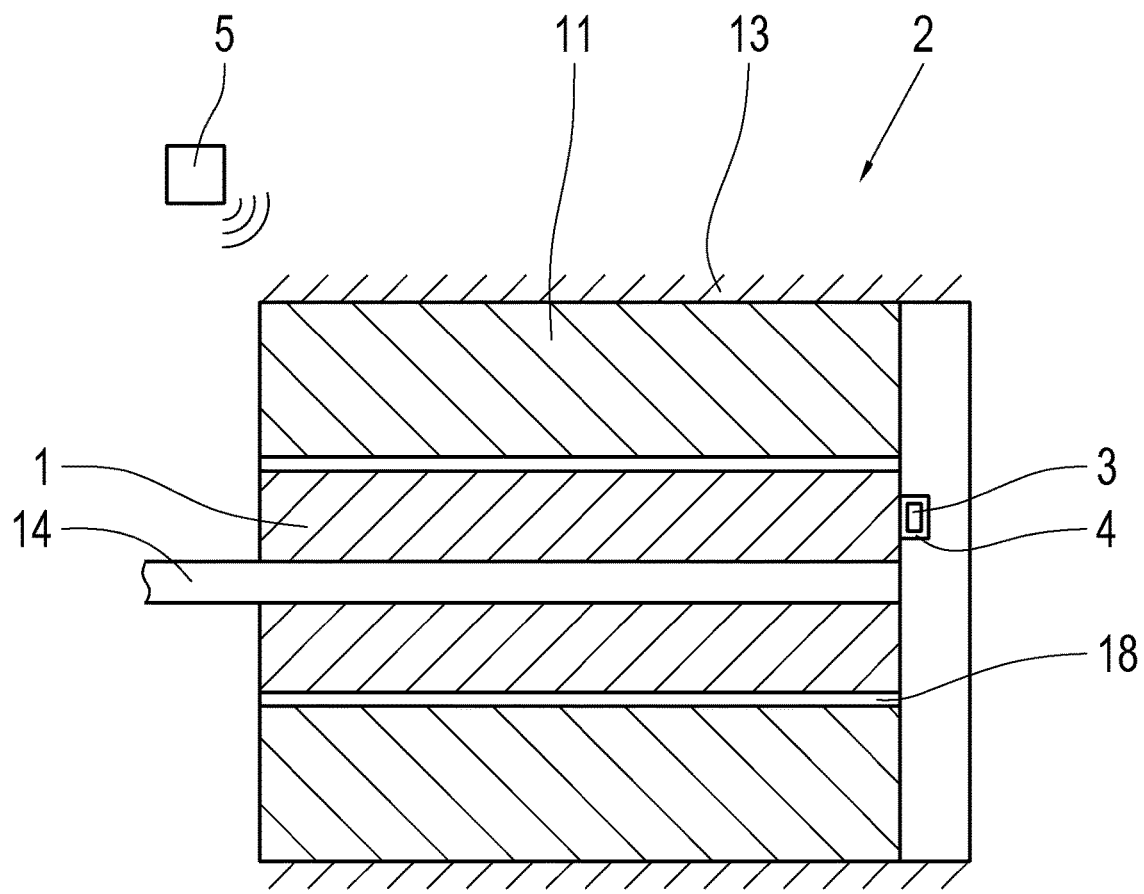
FIG. 2 shows a highly diagrammatic longitudinal sectional view of an electric machine according to the invention including a stator and a rotor.

FIG. 2 shows the electric machine 2, which includes the rotor 1, a stator 11, and the control device 5 for the open-loop control of the electric machine 2. An air gap 18 is formed between the stator 11 and the rotor 1. The rotor 1 is rotationally fixed to a rotor shaft 14. In the housing 13 of the electric machine 2, a signal processing unit 4 including a sensor element 3 is arranged on an end face of the rotor 1. In one embodiment, at least one sensor element 3 is integrated in the signal processing unit 4. Alternatively, the sensor element 3 is arranged in the interior of the rotor 1. Alternatively, the signal processing unit 4 is arranged in the interior of the rotor 1.

Figure 3:
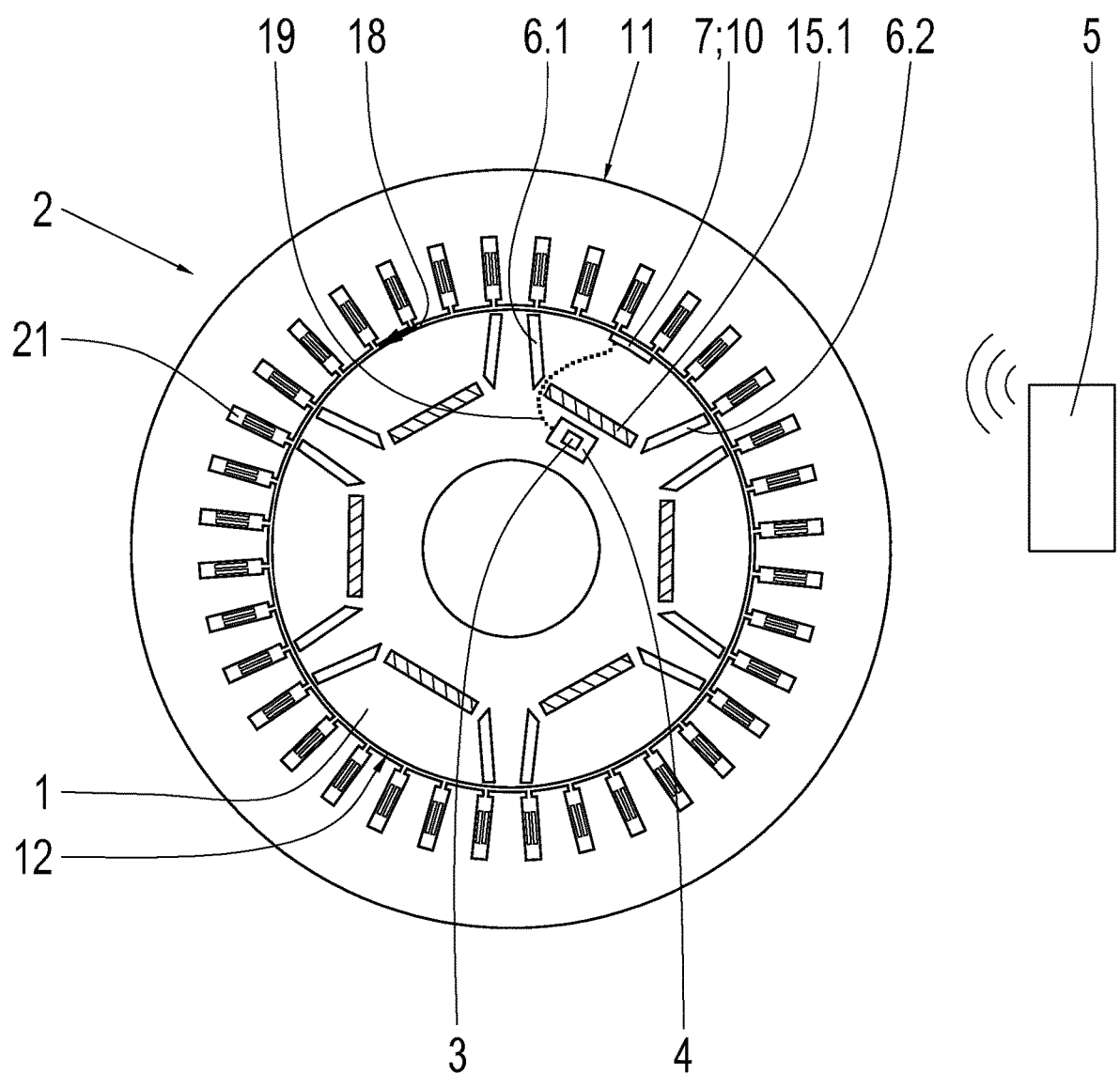
FIG. 3 shows a highly diagrammatic cross-sectional view of the electric machine according to the invention, according to FIG. 2.

FIG. 3 shows the electric machine 2 in a cross-section. The rotor 1 is rotatably arranged in the interior of the stator 11, wherein an air gap 18 is formed between the stator 11 and the rotor 1. The stator 11 has a stator body, as a stator laminated core, as well as multiple coils 21 accommodated by the stator body. The rotor 1 has a rotor body, as a rotor laminated core, and multiple permanent magnets 15.1 arranged in the interior of the rotor body. The permanent magnets 15.1 arranged in the interior of the rotor laminated core are also referred to as buried permanent magnets. These permanent magnets 15.1 form six poles in the present case. One permanent magnet 15.1 and two flux barriers 6.1, 6.2 are arranged in the area of or at each pole and, in fact, such that one flux barrier 6.1, 6.2 is arranged on each side, in the circumferential direction, of the particular permanent magnet 15.1.

In the present case, an induction coil 7 is arranged on a flexible circuit board 10 at an outer circumferential surface 12 of the rotor 1 and is configured for generating electrical energy from a magnetic field that is temporally changing during the operation of the electric machine 2 and for supplying the sensor element 3 and the signal processing unit 4 with this electrical energy. Alternatively, further induction coils 7 are arranged at the rotor 1 for generating electrical energy from the temporally changing magnetic field. The induction coil 7 is connected via a wiring 19 to the signal processing unit 4 and the sensor element 3 integrated therein. In order to convert the alternating current to direct current and provide the direct current for the sensor element 3, the signal processing unit 4 has, for example, an oscillating circuit (not represented in greater detail, but generally known), a rectifier, and a capacitor.

The sensor element 3 measures a temperature at the rotor 1 as a condition variable of the rotor 1 and transmits this condition variable to the signal processing unit 4. Optionally, multiple sensor elements 3 are arranged at the rotor 1, which detect, for example, different condition variables of the rotor 1. The signal processing unit 4 is configured to generate measured data from the detected condition variables of the rotor 1 and transmits the measured data to the control device 5 installed in the vehicle 100. The control device 5 is connected to the signal processing device 4 at the rotor 1 wirelessly, for example, via radio, and is configured for actuating the electric machine 2 under consideration of demands of a driver as well as operating parameters of the electric machine 2, in particular, operating parameters and/or condition variables of the rotor 1.

With the induction coil 7, it is possible to generate electrical energy during the operation of the electric machine 2. A temporally changing magnetic field flows through the induction coil 7 during the operation of the electric machine 2, i.e., when the rotor 1 is rotating, as the result of which an electric current or a voltage is induced in the particular induction coil 7, which is utilized for supplying electrical energy to the sensor element 3 and the signal processing unit 4, which are arranged at the rotor 1 in a rotationally fixed manner and rotate together with the rotor 1. The induction coil 7 is located at the outer circumferential surface 12 of the rotor 1 in the air gap 18 and does not come to rest against the stator 11.

Figure 4:
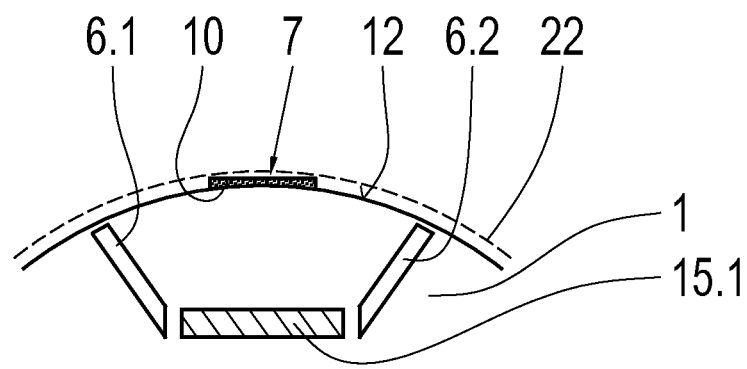
FIG. 4 shows a highly simplified, partial schematic view of the rotor according to FIG. 3 and in accordance with a first exemplary embodiment.

FIG. 4 shows an enlarged section of the rotor 1 from FIG. 3 in accordance with the first embodiment. The induction coil 7 is integrated in the flexible circuit board 10, wherein the circuit board 10 is arranged at the outer circumferential surface 12 of the rotor 1. Due to its flexibility, the circuit board 10 conforms, with the induction coil 7, to the curvature of the outer circumferential surface 12 of the rotor 1. Moreover, the circuit board 10 including the induction coil 7 is fixed at the outer circumferential surface 12 of the rotor 1 in a positionally fixed manner by a binding band 22. The circuit board 10 including the induction coil 7 is arranged on an axis that extends through the pole, i.e., in an area within the pole.

Figure 5:
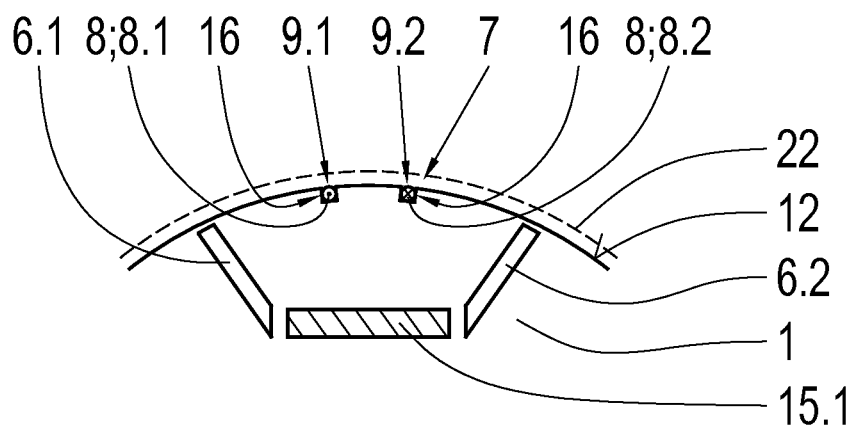
FIG. 5 shows a highly simplified, partial schematic view of a section of the rotor according to a second exemplary embodiment.

A second embodiment of the rotor 1 according to FIG. 5 differs from the first embodiment of the rotor 1 according to FIG. 4 merely in that the induction coil 7 is arranged in an indentation 16 provided therefor at an outer circumferential surface 12 of the rotor 1. Moreover, the induction coil 7 is fixed at the outer circumferential surface 12 of the rotor 1 by a binding band 22 in a positionally fixed manner, in particular so as to be fixed against falling out radially. A conductor 8 of the induction coil 7 extends in a first direction in a first area 9.1 of the rotor 1, and extends back from or opposite the first direction in a second area 9.2 of the rotor 1. The indentation 16 at the outer circumferential surface 12 of the rotor 1 is specifically for receiving the induction coil 7, and so the induction coil 7 is accommodated into the indentation 16 with an exact fit. The shape and the size of the induction coil 7, in particular the distance between a forward-conductor section 8.1 and a return-conductor section 8.2 of the conductor 8, are matched to strongly present orders of a harmonic field of the electric machine 2. The induction coil 7 is arranged on an axis that extends through the pole, i.e., in an area within the pole.

Figure 6:
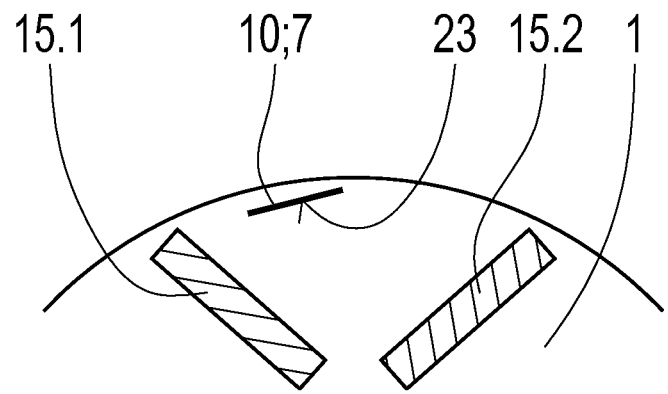
FIG. 6 shows a highly simplified, partial schematic view of a section of the rotor according to a third exemplary embodiment.

A third embodiment of the rotor 1 according to FIG. 6 differs from the second embodiment of the rotor 1 according to FIG. 4 merely in that the circuit board 10 including the induction coil 7 is not arranged at the outer circumferential surface 12 of the rotor 1, but rather in a slot 23 in the rotor 1. The slot 23 is a narrow recess, which extends in the longitudinal direction of the rotor 1 and is utilized for accommodating the circuit board 10 including the induction coil 7. Moreover, two permanent magnets 15.1, 15.2 are arranged in the area of each pole of the rotor 1. The circuit board 10 including the induction coil 7 is arranged in an area within the pole.

Figure 7:
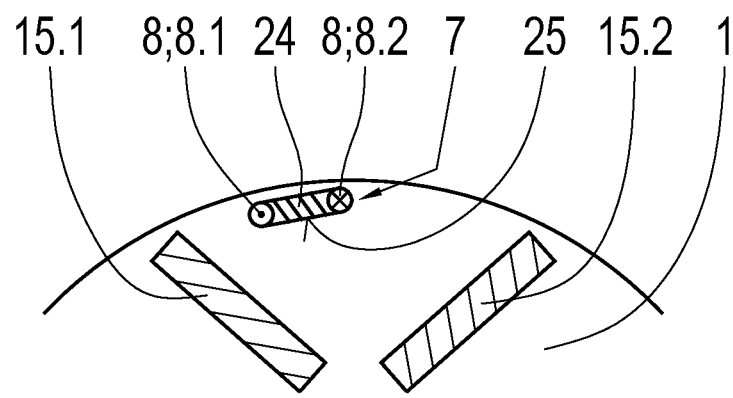
FIG. 7 shows a highly simplified, partial schematic view of a section of the rotor according to a fourth exemplary embodiment.

A fourth embodiment of the rotor 1 according to FIG. 7 differs from the third embodiment of the rotor 1 according to FIG. 6 merely in that the induction coil 7 is wound around a core 24, wherein a recess 25 is formed in the rotor 1 for accommodating the core 24 including the induction coil 7. Due to the core 24, the recess 25 is larger than the slot 23 according to FIG. 6. In order to influence the magnetic field of the rotor 1 to the least extent possible, the core 24 is formed from a plurality of axially stacked sheet-metal elements that are made of the same material as the rotor laminations. The shape and the size of the induction coil 7, in particular the distance between a forward-conductor section 8.1 and a return-conductor section 8.2 of the conductor 8, are matched to strongly present orders of a harmonic field of the electric machine 2. The core 24 including the induction coil 7 is arranged on an axis that extends through the pole, i.e., in an area within the pole.

Figure 8:
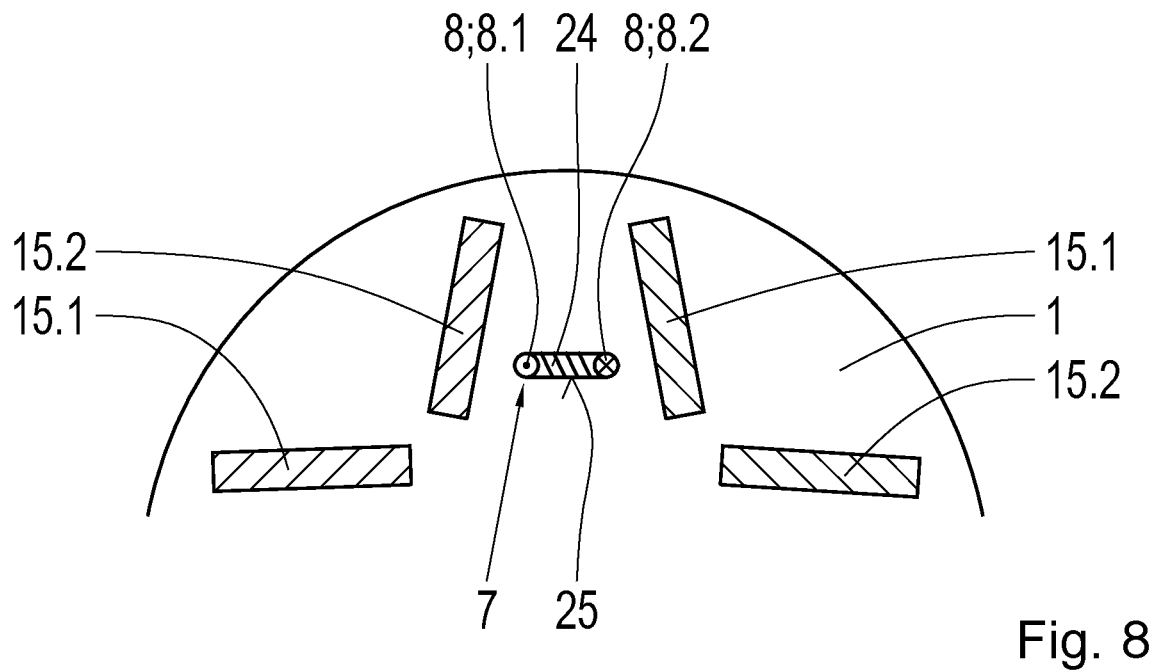
FIG. 8 shows a highly simplified, partial schematic view of a section of the rotor according to a fifth exemplary embodiment.

A fifth embodiment of the rotor 1 according to FIG. 8 differs from the fourth embodiment of the rotor 1 according to FIG. 7 merely in that the core 24 including the induction coil 7 is arranged in a recess 25 in an area between two poles.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 rotor
2 electric machine
3 sensor element
4 signal processing unit
5 control device
6.1 flux barriers
6.2 flux barriers
7 induction coil
8 electrical conductor
8.1 forward-conductor section
8.2 return-conductor section
9.1 first area
9.2 second area
10 circuit board
11 stator
12 outer circumferential surface
13 housing
14 rotor shaft
15.1 first permanent magnet
15.2 second permanent magnet
16 indentation
17 shaft
18 air gap
19 wiring
20 driving wheel
21 coil
22 binding band
23 slot
24 core
25 recess
100 vehicle

The invention claimed is:

1. A rotor (1) for an electric machine (2), comprising:
a rotor body including multiple poles;
at least one sensor element (3) for detecting at least one condition variable of the rotor (1);
a signal processing unit (4) connected to the at least one sensor element (3), the signal processing unit (4) being configured to generate measured data from the condition variable of the rotor (1) and to transmit the measured data to a control device (5); and
at least one induction coil (7), each of the at least one induction coil (7) includes at least one electrical conductor (8), the at least one induction coil (7) being arranged at the rotor (1) on an outer circumferential surface (12) of the rotor (1) and being configured to supply electrical energy to power one or both of the signal processing unit (4) and the at least one sensor element (3) from a magnetic field that is temporally changing during operation of the electric machine (2).

2. The rotor (1) of claim 1, wherein the at least one electrical conductor (8) of the at least one induction coil (7) extends in a first direction in a first area (9.1) of the rotor (1) and extends back from the first direction in a second area (9.2) of the rotor (1).

3. The rotor (1) of claim 1, wherein the at least one induction coil (7) is on a circuit board (10).

4. The rotor (1) of claim 3, wherein the circuit board (10) is flexible.

5. The rotor (1) of claim 3, wherein the circuit board (10) is on the outer circumferential surface (12) of the rotor (1).

6. The rotor (1) of claim 3, wherein the circuit board (10) and the at least one induction coil (7) are received in a slot (23) defined in the rotor (1).

7. The rotor (1) of claim 1, wherein the at least one induction coil (7) is received in an indentation (16) defined in the outer circumferential surface (12) of the rotor (1).

8. The rotor (1) of claim 1, wherein the at least one induction coil (7) is fixed on the outer circumferential surface (12) of the rotor (1) by one or both of adhesive and a binding band (22).

9. The rotor (1) of claim 1, wherein the at least one induction coil (7) is between two of the multiple poles or on an axis that extends through one of the multiple poles.

10. The rotor (1) of claim 1, wherein the signal processing unit (4) is on an end face of the rotor (1).

11. The rotor (1) of claim 1, further comprising at least one permanent magnet (15.1, 15.2) proximate each of the multiple poles of the rotor (1).

12. An electric machine (2), comprising:
a control device (5) for open-loop control of the electric machine (2);
a stator (11); and
the rotor (1) of claim 1.

13. A rotor (1) for an electric machine (2), comprising:
a rotor body including multiple poles;
a rotor shaft extending along an axial direction, the rotor body being fixed to the rotor shaft for rotation with the rotor shaft about the axial direction;
at least one sensor element (3) for detecting at least one condition variable of the rotor (1);
a signal processing unit (4) connected to the at least one sensor element (3), the signal processing unit (4) being configured to generate measured data from the condition variable of the rotor (1) and to transmit the measured data to a control device (5); and
at least one induction coil (7), each of the at least one induction coil (7) includes at least one electrical conductor (8), the at least one induction coil (7) being arranged at the rotor (1) and being configured to supply electrical energy to power one or both of the signal processing unit (4) and the at least one sensor element (3) from a magnetic field that is temporally changing during operation of the electric machine (2), the at least one induction coil (7) extending at least partially along the axial direction.

14. The rotor (1) of claim 13, wherein the at least one electrical conductor (8) of the at least one induction coil (7) extends in a first direction in a first area (9.1) of the rotor (1) and extends back from the first direction in a second area (9.2) of the rotor (1).

15. The rotor (1) of claim 13, further comprising at least one core (24), each of the at least one induction coil (7) being wound around a respective one of the at least one core (24),
wherein a recess (25) is defined in the rotor (1) for accommodating each of the at least one induction coil (7) and the respective one of the at least one core (24), each recess (25) extending in the axial direction.

16. The rotor (1) of claim 15, wherein each of the at least one core (24) comprises a plurality of axially stacked sheet-metal elements.

17. An electric machine (2), comprising:
  a control device (5) for open-loop control of the electric machine (2);
  a stator (11); and
  the rotor (1) of claim 13.

\* \* \* \* \*